United States Patent Office 2,935,530
Patented May 3, 1960

2,935,530

PREPARATION OF CLEAVAGE PRODUCTS FROM RICINOLEIC STOCK

Yves Bourgeois, Paris, France, assignor to Societe des Produits Chimiques de Bezons, Bezons, France No Drawing. Application October 15, 1957
Serial No. 690,227

Claims priority, application France November 7, 1956

5 Claims. (Cl. 260—537)

This invention relates to methods of preparing valuable cleavage products especially sebacic acid 2-octanone and 2-octanol from ricinoleic acid and derivatives thereof, by high temperature oxidizing scission in the presence of caustic alkalis.

It is well-known that when ricinoleic stock containing ricinoleic acid and various derivatives of this acid, particularly esters thereof, is subjected to elevated temperatures in the presence of caustic alkalis, the ricinoleic molecule splits to yield on the one hand unsaponifiable alcohols and ketones specifically 2-octanol and 2-octanone and, on the other hand, acids having 10 carbon atoms namely ω-hydroxydecanoic acid and sebacic acid. The cleavage reaction further produces a discharge of hydrogen gas. The chief commercial source of ricinoleic acid is castor oil, which contains about 85% ricinoleic triglyceride.

The yield in cleavage products is greatly influenced by the concentration and proportion of the caustic alkali and by the reaction temperature used. As regards alkali concentration, it can be said that with dilute alkali solutions the reaction only proceeds to a limited extent, while on the other hand, when excessively high alkali concentrations or anhydrous alkalis are used, the reaction proceeds rapidly to completion but the sebacic acid and ω-hydroxydecanoic acid which tend to form are destroyed to some extent.

As regards the influence of temperature, at 200° C. the reaction rate is very slow. At about 300° C. and higher, the reaction rate is high (provided an appropriate alkali concentration is provided), but in this case also the sebacic acid and ω-hydroxydecanoic acid products are partly or wholly destroyed so that the over-all yield falls off; the yield is sacrificed to reaction rate.

During the reaction the ω-hydroxydecanoic acid forms at a lower temperature than does the sebacic acid. In fact, the sebacic acid apparently forms from the intermediate ω-hydroxydecanoic acid product by dehydrogenation. When therefore it is desired, in the commercial process, to produce sebacic acid free of ω-hydroxydecanoic acid, the reaction should be conducted under such conditions as to time and temperature, that the precise point is reached where the efficiency of the reaction begins to drop off due to incipient destruction of the sebacic acid.

As a result of the above conflicting conditions, it has not been found possible heretofore to perform the ricinoleic oxidizing cleavage reaction under economically satisfactory conditions both as to yield in commercially valuable end products, and reaction rate. It is consequently an important object of this invention to eliminate the above difficulties and to provide an improved method of cleaving ricinoleic acid and derivatives thereof which will yield more advantageous results than were heretofore possible. Another object is to produce sebacic acid substantially free of ω-hydroxydecanoic acid with a high rate of reaction and without any sacrifice in the efficiency ratio of the reaction.

The invention is based on the finding that the ricinoleic cleavage reaction will proceed at a high rate and with a high yield in sebacic acid, if performed in the presence of an alkali metal nitrate, in a proportion of approximately from 1 to 10% by weight in terms of the ricinoleic acid used. The invention as thus defined may be practically carried out in a wide variety of ways. Thus, according to one procedure the reaction may be effected at ordinary atmospheric pressure, and the octyl products may be distilled off concurrently as they are formed. Or the reaction may be performed at superatmospheric pressure in an autoclave, and the pressure rise due to vapour tension and the pressure of the released hydrogen may be limited to a predetermined value by intermittently venting the reaction space. It should be noted that, according to the invention, it is found advantageous to maintain a certain degree of pressure above the reaction mixture in order to avoid the formation of the heavy foam that tends to occur on heating at ordinary pressure.

Whatever the specific procedure employed however, the provision of a suitable amount of alkali metal nitrate in the reagent medium according to the invention will in all cases consistently ensure a substantial acceleration of the cleavage rate of the ricinoleic molecule. This broad improvement in the kinetics of the alkaline cleavage reaction of ricinoleic acid has many and important commercial advantages. The process output is substantially increased and the expenditure in heat energy considerably reduced. Moreover, as previously indicated, secondary reactions such as the unwanted production of ω-hydroxydecanoic acid accompanying the production of sebacic acid, are largely eliminated and, other factors being equal, a substantial increase simultaneously occurs in the yield of 2-octanol and 2-octanone together with that of the sebacic acid. By the process of the invention, a sebacic acid product almost entirely free of ω-hydroxydecanoic acid is directly and easily obtained. This can be readily seen from the fact that sebacic acid as produced by the process of the invention has a slightly higher melting point, than so-called pure sebacic acid as obtained by the conventional cleavage process, and in contrast to the latter is not oxidizable by potassium permanganate.

The applicant is aware that various catalytic methods had previously been proposed in an attempt to improve the commercial efficiency of the alkaline ricinoleic acid cleavage reaction. Thus it has been stated that improved results were obtained where the walls of the reactor in which the reaction was performed comprised copper rather than iron. The use of catalysts of the copper chromite type has also been described for increasing the proportion of 2-octanol in relation to the 2-octanone formed, by rehydrogenation in situ. Further, it has been stated that the presence of cadmium salts and/or cadmium oxide exerts a favourable influence on the reaction rate and on the yield in sebacic acid. However, a common feature of all such catalytic processes of the prior art was, that they invariably involved a heterogeneous catalytic action. In contrast the alkali metal nitrate used according to this invention acts as a homogeneous catalyst.

The general advantages of homogeneous over heterogeneous catalysis are well-recognized, and include, inter alia: complete facility for establishing perfect contact conditions; no surface alteration of the catalyst; elimination of all problems involving the support, suspension, and/or fluidization of the catalyst; no requirement to filter or otherwise separate off the spent catalyst. The above advantages which are present in any homogeneous catalysis process are of special importance in connection with the alkaline cleavage reaction of ricinoleic acid, since in this case the reagent medium is highly concentrated, viscous and corrosive to a number of structural materials. Inasmuch as alkali nitrates are inherently soluble even in highly concentrated solutions of caustic alkalis, the homogenizing process with ricinoleic acid and/or its esters is effected just as easily and quickly as with the alkali solutions alone, since the homogenization involves a mere salification action (in case ricinoleic acid is used), or a saponification (if an ester is involved); either of these two actions can proceed at ordinary temperature, while at elevated temperatures the homogenizing action will be completed within an extremely short time, well before the actual cleavage reaction has set in.

The advantageous action of alkali metal nitrates in connection with a ricinoleic acid cleavage reaction according to this invention has been discovered experimentally and it is not desired to put forward any theory concerning the precise mechanism by which such action is effected. It may however be stated that definitely more than simple oxidation is here involved. In fact the quantity of available oxygen introduced by the nitrate when used in the proportions specified above, is substantially lower than what would be required in order to absorb the hydrogen released during the reaction. Moreover, if the proportion of nitrate used is increased above about 10%, it is found that a drop in efficiency occurs and the characteristics of the cleavage end products are seriously impaired. Furthermore, oxidizing salts other than the specified nitrates have been tested, including alkali permanganates, chromates, ferricyanides, and arseniates, without any substantial improvement in the reaction being observed. While alkali chlorates and perchlorates do increase the cleavage reaction rate somewhat, and correspondingly increase the yield in useful products, the increase is considerably less marked than that obtained with nitrates, and moreover the chlorine derivatives impart increased corrosiveness to the reagent mixture towards ferrous parts in the equipment.

Alkali nitrate according to the invention may be directly added into the reagent medium, or may be formed in situ from its constituents. Thus, the caustic soda sodium and/or potassium hydroxides conventionally used as the caustic alkali ingredient in the alkali cleavage process, may be provided in excess amount, and a nitrate of some other suitable metal may be added into the medium whereby the metal will be displaced and the desired alkali metal nitrate will be generated.

Some practical examples will now be given of the manner in which the invention may be practically performed, it being understood that the ensuing examples are to be considered as illustrative but not restrictive of the scope of the invention.

*Example 1*

In connection with this example, procedure according to the conventional alkali-cleavage reaction of ricinoleic acid will first be summarized.

*Conventional procedure.*—In an autoclave 1 liter in capacity, mounted on a rocking support as a means of agitating the reaction medium, and provided with a stainless steel internal lining, there are introduced 200 grams castor oil and 300 grams of a caustic soda lye having a concentration of 42% by weight.

The agitating means are set into motion and the temperature is raised rapidly to 270° C., the internal pressure being thereby raised to about 60 kg./sq. cm. The internal pressure value depends on the filling of the apparatus and would of course be higher if a larger amount of reagents had been used. The said temperature is maintained for 8 hours. The valve of the autoclave is connected with a refrigerator and the mixture of hydrogen and vapours is gradually discharged by condensation of the liquefiable fractions. There is recovered in this way, water and a mixture of 2-octanol and 2-octanone, the mixture being sometimes known as "crude capryl alcohol." The residuum is taken up with hot water and neutralized to pH 5.5–6, thereby separating the fatty monoacids which are primarily provided by the non-ricinoleic portion of the castor oil. The aqueous layer of sodium sebacate is then acidified to pH 2 to precipitate the sebacic acid, the product is filtered, washed and dried in an oven to constant weight.

There are obtained 76 grams of sebacic acid, melting point 132° C., and 52 grams crude capryl alcohol.

*Procedure according to the invention.*—The same procedure is followed, except that 6 grams sodium nitrate were first dissolved, in the caustic soda lye. At the end of 8 hours reaction time there are obtained 84 grams sebacic acid having a melting point of 132.5° C. and 61 grams crude capryl alcohol.

With all other conditions remaining equal, it is seen that application of the invention has resulted in over 10% increase in the yield of sebacic acid and nearly 15% increase in the yield of capryl alcohol. Moreover, the sebacic acid product is of increased purity as indicated by a higher melting point.

*Example 2*

Using the same equipment as in Example 1, four different tests are performed, each time using the same amounts of the same ingredients, namely 200 grams castor oil and 257 grams caustic soda lye at a concentration of 41.6% by weight. The mixture is heated rapidly to 270° C. in each test, and the heating is discontinued at the end of different periods of time at each test, as follows: first test, 1 hour; second test, 2 hours; third test, 4 hours; and fourth test, 8 hours.

A corresponding sequence of tests is further performed, with the same operating conditions except that 6 grams of sodium nitrate are in each test added to the caustic soda lye according to the teaching of the invention.

In each test of each series, the reaction products are separated by the procedure described in Example 1, and the $C_{10}$ acids separated are tested for acid index so as to determine the relative proportions of sebacic and ω-hydroxydecanoic acid in the mixture, it being noted that the theoretical acid index of sebacic acid is 556.

The results of the above tests are indicated in the following table:

| Reaction Time | 1 hr. | 2 hrs. | 4 hrs. | 8 hrs. |
| --- | --- | --- | --- | --- |
| Weight of crude capryl alcohol obtained: | | | | |
| without $NaNO_3$............g.. | 52 | 54 | 55 | 56 |
| with $NaNO_3$............g.. | 59 | 62 | 62 | 62 |
| Weight of $C_{10}$ acids obtained: | | | | |
| without $NaNO_3$............g.. | 63 | 71 | 74 | 76 |
| with $NaNO_3$............g.. | 73 | 76 | 81 | 84 |
| Acid index of the $C_{10}$ acids: | | | | |
| without $NaNO_3$............ | 460 | 520 | 540 | 555 |
| with $NaNO_3$............ | 520 | 540 | 553 | 554 |

It is clearly apparent from the table that the addition of the nitrate accelerates the formation of crude capryl alcohol and of $C_{10}$ acids at the same time increases the proportion of sebacic acid relatively to ω-hydroxydecanoic acid in the end product.

*Example 3*

Alkali cleavage of castor oil is performed as a continuous process in a vertical tubular autoclave of stainless steel, 5 meters long and 15 cm. inner dia., by continuously introducing into the bottom end of the autoclave by means of proportioning pumps, castor oil and caustic soda lye (40% by weight concentration) in the following proportions: Castor oil 100 parts, soda lye 160 parts by weight.

The reactor is heated to 290° C. by circulating heated fluid through a water jacket of the reactor. It is found that maximum yield in sebacic acid is obtained when the dwell of the reagents in the reactor is 8 hours. The reaction products are discharged as continuous streams from the top of the reactor, namely a first stream of concentrated alkaline solution of sebacate, and a partly condensable stream of volatile products on the other hand. As result of the continuous discharge of the volatile products the pressure in the reactor is limited to about 20–30 kg./sq. cm. The reaction products are recovered the same procedure as in Example 1, and it is found that from every 100 parts of castor oil used, there are obtained 37.5 parts sebacic acid and 24 parts crude capryl alcohol.

Leaving all other conditions unchanged, sodium nitrate is introduced into the input stream, in a proportion of 2% NaNO$_3$ by weight of the castor oil, and it is found that the optimum yield in capryl alcohol is now obtained when the reagents dwell only 5 hours in the reactor. The effluent products now contain 39 parts sebacic acid and 31 parts crude capryl alcohol per 100 parts input castor oil.

*Example 4*

Into an electrically heated steel autoclave, there are introduced 100 parts castor oil and 120 parts of 45% caustic soda lye. The temperature is maintained at 270° C. for 8 hours and the pressure is regulated to a value of about 40 kg./sq. cm.

There are obtained 38.5 parts sebacic acid (M.P. 132° C.) and 26 parts crude capryl alcohol.

Under identical conditions, 4 parts sodium nitrate are added and the heat is turned off at the end of 5 hours (instead of 8). The results is 42.5 parts sebacic acid (M.P. 132.5° C.) and 30 parts crude capryl alcohol.

*Example 5*

The operating conditions are the same as in Example 1 (procedure according to the invention), except that 6 grams potassium chlorate are added in place of the sodium nitrate. The product is found to comprise 80 grams sebacic acid (M.P. 132° C.) and 58 grams crude capryl alcohol. This test shows that though the addition of chlorate is advantageous, it is substantially less desirable than the nitrate according to the invention.

*Example 6*

The same general operating conditions as in Example 1 are used, starting with 200 castor oil and 430 grams caustic potassium lye at a concentration of 40% by weight. When no nitrate is added, there are obtained 75 grams sebacic acid (M.P. 132° C.) and 51 grams crude capryl alcohol. When on the other hand 8 grams of potassium nitrate are added, the respective figures are 83 grams sebacic acid (M.P. 132.5° C.) and 61 grams crude capryl alcohol.

What I claim is:

1. In a method of producing sebacic acid, 2-octanol and 2-octanone by reacting ricinoleic stock with caustic alkali, the improvement which comprises carrying out said reaction in the presence of an alkali metal nitrate selected from the group consisting of sodium and potassium nitrates in a proportion of approximately 1 to 10% by weight based on the ricinoleic acid in said stock.

2. In the method of claim 1, the steps of maintaining ordinary atmospheric pressure conditions and progressively distilling off the volatile products formed in said reaction.

3. In the method claimed in claim 1, the step of performing said reaction in a sealed enclosure and preventing discharge of volatile reaction products to maintain a substantial superatmospheric pressure in said enclosure.

4. In the method claimed in claim 1, the step of performing said reaction in a sealed enclosure and discharging volatile reaction products at a controlled rate to maintain a superatmospheric pressure in said enclosure.

5. In the method claimed in claim 1, the step of performing said reaction continuously.

References Cited in the file of this patent

UNITED STATES PATENTS

| | | |
|---|---|---|
| 2,693,480 | Haury | Nov. 2, 1954 |
| 2,696,500 | Stein | Dec. 7, 1954 |
| 2,734,916 | Bolley et al. | Feb. 14, 1956 |